United States Patent [19]

Cerroni

[11] Patent Number: 4,776,960
[45] Date of Patent: Oct. 11, 1988

[54] PLANT FOR AEROBIC BIOLOGICAL TRANSFORMATION OF ORGANIC WASTE

[76] Inventor: Manlio Cerroni, Viame Poggio Fiorito, 63, I Roma, Italy

[21] Appl. No.: 27,057

[22] Filed: Mar. 23, 1987

Related U.S. Application Data

[62] Division of Ser. No. 862,238, Apr. 3, 1986, abandoned.

[30] Foreign Application Priority Data

Aug. 7, 1984 [IT] Italy .............................. 48702 A/84

[51] Int. Cl.$^4$ .......................... C02F 11/06; C05F 9/02
[52] U.S. Cl. .................................... 210/620; 210/768; 210/527; 71/9; 422/225
[58] Field of Search ............... 210/609, 620, 747, 768, 210/780, 205, 219, 251, 319, 527, 531; 71/9, 11-13; 435/316; 422/225, 229

[56] References Cited

U.S. PATENT DOCUMENTS 3,357,812 12/1967 Snell ........................................ 71/9

FOREIGN PATENT DOCUMENTS 2227245 11/1974 France .
2320922 3/1977 France .
2391164 12/1978 France .
3210655 10/1982 Fed. Rep. of Germany .
1453232 10/1976 United Kingdom .

Primary Examiner—Tom Wyse
Attorney, Agent, or Firm—Watson, Cole, Grindle & Watson

[57] ABSTRACT

A plant for the aerobic biological transformation of organic waste materials, in which the stirring screws which control the agitation and the forward movement of the material being treated are immersed in the biomass, and thus operate actively, when moving in the direction opposite the movement of said material, while, in the opposite course, i.e., in the direction which is concurrent with the movement of the material, they are extracted from the biomass, with the axis of the stirring screws being inclined at an appropriate angle, which is preferably between 10 and 60 degrees, with respect to the vertical, with the material being moved towards the unloading area by the displacement in the loading area of the screws, which are inclined and rotating in the raising direction of the biomass. In addition, the screws vary this angle, inceasing with respect to the vertical, by gradually moving from the material unloading side on the reservoir towards the loading side, while the distance of said screws from the bottom remains constant.

3 Claims, 1 Drawing Sheet

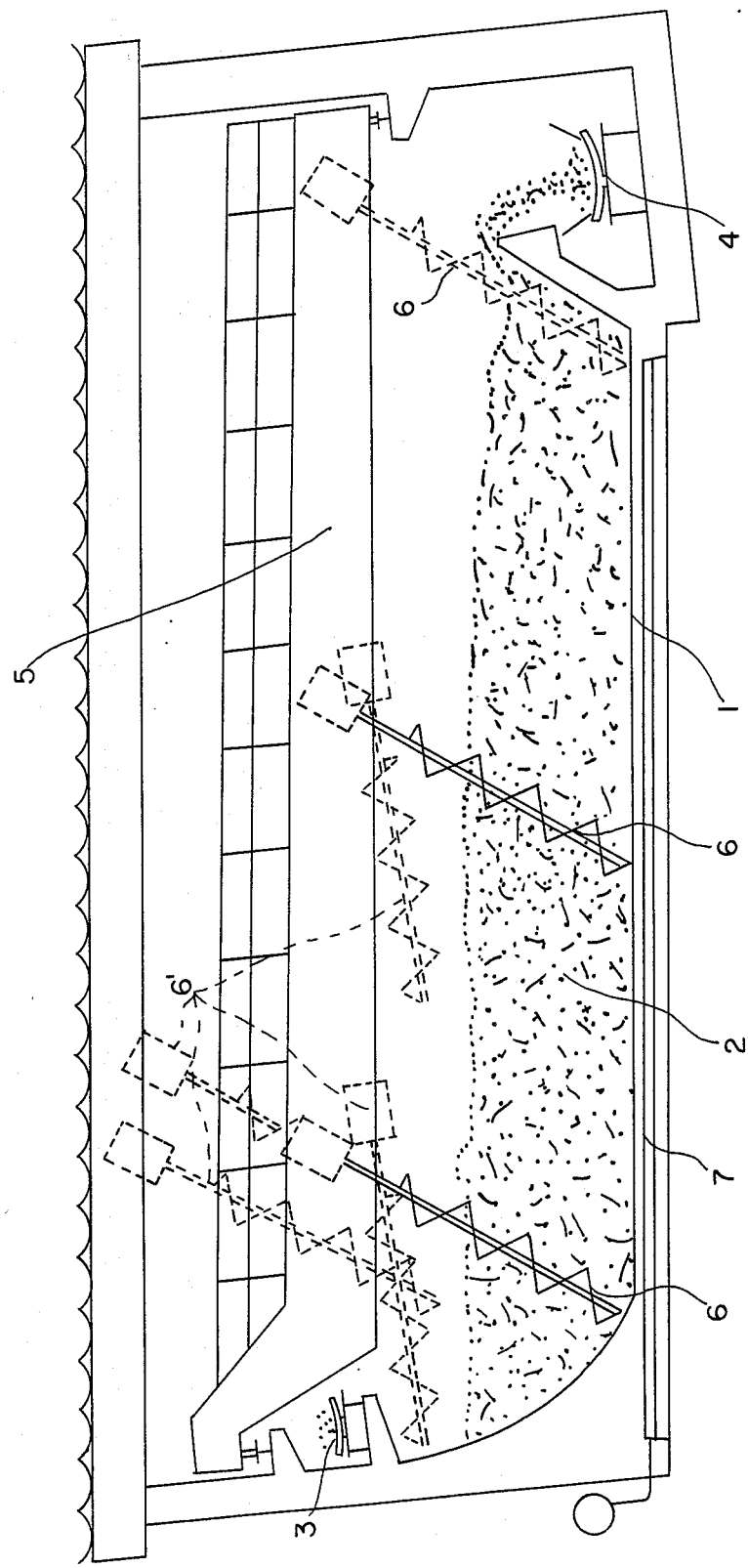

PLANT FOR AEROBIC BIOLOGICAL TRANSFORMATION OF ORGANIC WASTE

This application is a division of application Ser. No. 852,238, filed Apr. 3, 1986, now abandoned.

DESCRIPTION

Processes are known for cnversion into compost, i.e., into organic fertilizer, of organic refuse materials and especially organic materials recovered from solid urban waste, sediments coming from urban waste water treatment plants, as well as from residues of zootechnical and agricultural installations.

These processes are based essentially on three main operations, including: agitation of the biomass, the homogenization and automatic advancement thereof with the simultaneous introduction of air to provide the quantity of oxygen which is necessary for aerobic decomposition by microorganisms.

Many installations are also known which combine the three main functions mentioned above, but these known installations each present limitations which put efficiency into question.

Indeed, one of the main differences between the various known installations especially is the means employed to move the material, which is collected in a continuous or discontinuous manner in treatment reservoirs and removed therefrom, preferably by continuous means; means which can be grouped into two basic types: those which are comprised of rotating milling mechanisms which, immersed in the mass which is being treated, agitate it and move it from the entry point to the outlet; those comprised of stirring screws which effect a similar operation by combining rotating movement with translation movement.

The basic concept of the latter operating means is that they are comprised of one or more groups of screws suspended on a moving platform, which is placed orthogonally or slightly inclined with respect to the plane of the reservoir. The screws are placed in rotation and with their translation movement along the moving platform, combined with their axial rotation, push the material from the loading area to the outlet area. The movement of all of the screws is effected in the directions and manners indicated. In the passive run, i.e., in the return run of the screws from the unloading side to the loading side, the screws are extracted from the mass which is being treated. Systems of this type are described, for example, in Swedish Pat. No. 73 06001-4 submitted on Apr. 27, 1973 in the name of Johnson Construction Company AB.

The systems which are highlighted above with special reference to the systems utilizing screws present various inconveniences, in particular:

The required power is high, because the material is moved forward by the pushing of the screws against the mass and not by the movement thereof along the axis of said screws;

The stress level on the screw shaft is considerably high because they are cantilevered by a few meters from the moving platform and the forces are transferred over the entire structure of the moving platform, with the consequent problems of excessive swaying and internal vibrations;

As a consequence of the high degree of power and stress involved, a great amount of water and tear occurs on the agitating screws.

As the result of the above, there are strict limits on the thickness of the material to be treated since the stress increases exponentially with said thickness.

The object of this invention is a system which eliminates the disadvantages described above and which offers the following advantages;

The possibility of theoretically unlimited thicknesses for the material, since the increase in stress is proportional and not exponential;

A reduction in treatment plant surface area due to the increase in thickness of the material which is being treated;

Very limited comsumption, which is reduced for the same thickness, up to 50%;

Reduced wear and tear of the screws in the same proportion as the power requirement;

reduced stresses on the mechanical components and absence of vibrations;

the possibility of maintaining the thickness of the material which is being treated constant, by offsetting the decrease in volume which occurs during the biological process either by chemical action (evaporation, formation of $CO_2$, etc.) or physical action (decomposition of large particles, etc.)

The original concept on which the installation is based, in accordance with the invention, lies in the fact that the active run of the screws occurs from the unloading side to the loading side. As such, the screws operate on the materials being treated while they move along the moving platform from the unloading side of the loading side, contrary to the practice up to this time. This means that the material to move upward along the screw, ending up in the upper part. Obviously, with an increase in the thickness of the material being treated, the power which is necessary for the operation of the installation will increase proportionally. On the other hand, the transverse stress on the axis of the screws is greatly limited since the stress is substantially axial.

Through the use of the original concept presented above, the material is mixed from the bottom towards the top and is simultaneously moved forward towards the unloading side, with the screws and the material moving in opposite directions.

Moreover, since the forward movement of the material increases as the inclination of the screws increases with respect to the vertical, in accordance with the invention, the inclination of the screws changes during their course of operation, while they progress from the unloading side to the loading side of the reservoir. Such an inclination increases in particular with respect to the vertical while the screws are moving forward. In addition, since, as a result of the inclination angle increase with respect to the vertical, the ends of the screws would move away from the bottom of the reservoir, the screws are gradually lowered in order to maintain a constant distance between their tip and the bottom. From this ensues the additional advantage of maintaining the thickness of the material to be treated constant, since the quantity of material unloaded from the reservoir is kept at a smaller level than that of the loaded material. Thus, the reservoir will have a greater capacity and, as such, given the same number of days of permanence and the same quantity of material, has a reduced surface area.

The installation for the aerobic biological transformation of organic waste materials in accordance with the invention will be explained in greater detail in the description which follows, for one of its preferred forms of embodiment, which is illustrated schematically in the attached drawing, in which a cross section is shown.

With reference to said drawing, the reservoir 1 for the biomass 2 is fed, preferably in a continuous mode, by a conveyor belt 3 or similar means.

The reservoir 1 is straddled by a moving platform 5, on which one or several screws 6 are installed, each of which has two complementary motions: a rotational movement around its own axis and a translational movement along the platform 5, from one edge of the reservoir or digester 1 to the other. The moving platform 5 has an intermittent translational motion along the longitudinal axis of the digester 1 in order to allow the treatment of the material in successive sections, so that the reservoir can be of an appropriate and convenient length.

The active run of the screws 6 occurs as they move along the moving platform 5 from the unloading side, which is shown in the drawing as the carrier 4, to the loading side indicated as the carrier 3.

In the return phase, i.e., on the path from the carrier 3 to the carrier 4, the screws 6 are extracted from the mass 2 through the use of any appropriate system, for example, by rotation with respect to the platform 3 or by raising, etc., as indicated by the lines extending from 6'.

The screws 6 are preferably more than one in number, placed side by side in the longitudinal direction of the reservoir 1, as a function of the capacity of the installation. Additional screws 6 can also be provided, placed in the longitudinal direction of the moving platform 5 so that each of these, or each group thereof must pass through only a portion of the width of the reservoir 1, as such, reducing the working time for each individual section of the digester.

It is to be emphasized that, in accordance with the invention, the screws 6 are suitably inclined with respect to the vertical, for example, at 10-60 degrees, to facilitate the work of the shifting movement of the screws, simultaneously reducing the energy which is required as well as mechanical wear and tear.

As shown schematically in the drawing, the installation will be supplemented with air blowing or suction equipment 7 to supply the oxygen which is necessary for the activity of the aerobic bacteria, as well as with means for the abduction of mud and/or water collected from city water purification plants, etc.

In addition, it is recalled that, as stated above with respect to the reduction in the thickness of the material being treated, a reduction which is offset by an increase in the inclination angle of the axis of the screws 6 with respect to the vertical and thus the unloading into 4 of a smaller amount of material than that which is loaded on the loading side 3 of the reservoir, with the screws 6 maintaining a constant distance between their free end and the bottom, for example, by the lowering thereof along the platform 5.

In the drawing, the bottom of the reservoir is shown at an angle with respect to the horizontal, but this is not a determining factor, with a certain inclination being preferred for the transfer of waster water from the loading zone, where the material has a higher water content, to the unloading area, where the material is already partially dried.

The installation for the aerobic biological transformation of organic waste materials in accordance with the invention has been described and illustrated solely as a non-limitative example. Obviously, the invention will lend itself to variations which will emerge in technology and in practical applications, without as such departing from the framework of said invention, as described in the claims below.

I claim:

1. A method of aerobically treating organic waste materials in an apparatus which includes an elongated digester having a front end wall, a rear end wall, opposite side walls and a floor which slopes downwardly from said front end wall to said rear end wall, said floor defining a discharge means near said rear end wall; a feed means for supplying organic waste materials into said elongated digester near said front end wall; a platform which extends from said front end wall to said rear end wall; and at least one screw device, each screw device being movably and pivotably mounted on said platform so as to be movable back and forth in the longitudinal direction of said elongated digester and pivotable so as to extend downwardly to said floor or substantially horizontally, said method comprising the sequential steps of (1) operating said feed means so as to supply organic waste materials to said digester and provide a biomass of organic waste materials therein extending from said front end wall to said discharge means of said floor, (2) moving each said screw device along said platform so as to be located near said discharge means of said floor, (3) downwardly pivoting each said screw device to an angle such that it extends towards said front end wall and downwardly towards said floor and into said biomass, (4) rotating each said screw device so as to simultaneously cause both agitation of said biomass and movement of said biomass therearound towards said discharge means of said floor, (5) simultaneously with step (4), moving each said screw device along said platform towards said front end wall until it is near said front end wall, (6) upwardly pivoting each said screw device such that it extends almost horizontally and towards said front end wall, and, (7) repeating steps (2)-(6).

2. The method as defined in claim 1, wherein in step (5) each said screw device is incrementally moved towards said front end wall.

3. The method as defined in claim 1, wherein as each of said screw devices is moved towards said front end wall in step (5) it is lowered towards said floor and simultaneously gradually upwardly pivoted.

* * * * *